A. HENHAPL.
BED PAN.
APPLICATION FILED JULY 9, 1908.
916,864.  Patented Mar. 30, 1909.
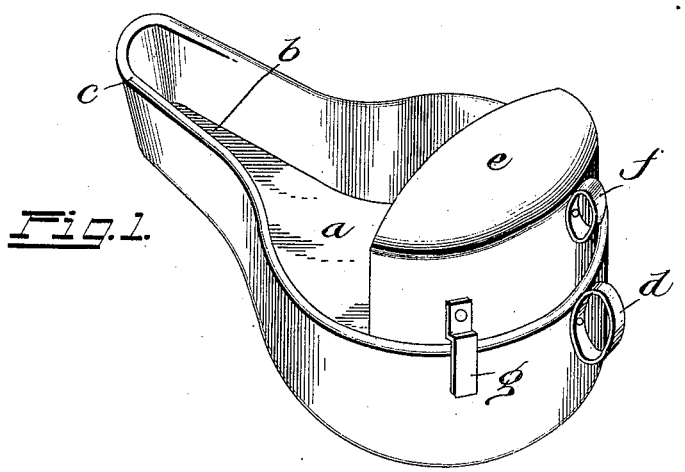
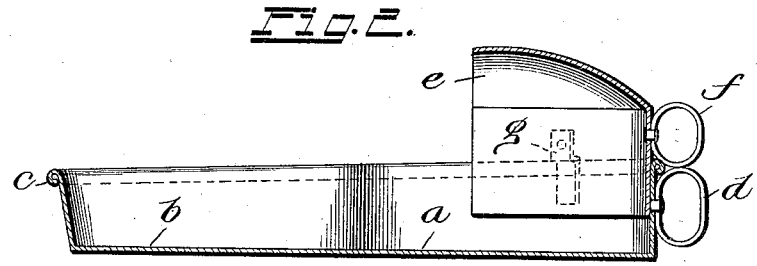
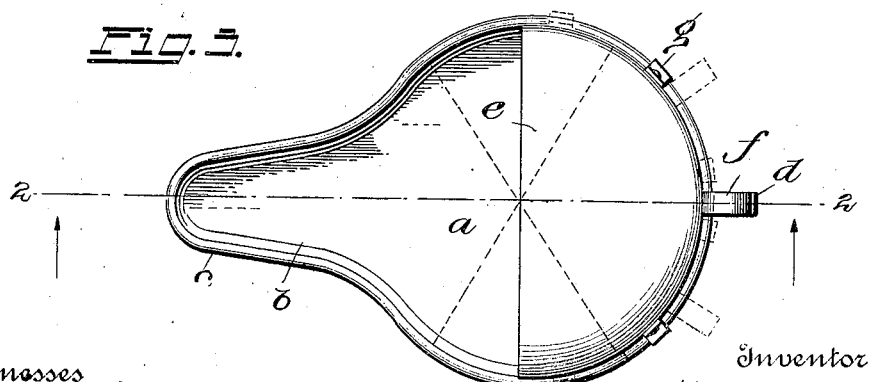
Witnesses
W. May Duvall.
Martin T. Fisher.
Inventor
Andrew Henhapl.
By Wilkinson, Fisher & Witherspoon
Attorneys.

UNITED STATES PATENT OFFICE.

ANDREW HENHAPL, OF SUPERIOR, WISCONSIN.

BED-PAN.

No. 916,864.     Specification of Letters Patent.     Patented March 30, 1909.

Application filed July 9, 1908. Serial No. 442,682.

*To all whom it may concern:*

Be it known that I, ANDREW HENHAPL, a citizen of the United States, residing at Superior, in the county of Douglas and State of Wisconsin, have invented certain new and useful Improvements in Bed-Pans; and I do hereby declare the following to be a full, clear, and exact description of the invention, such as will enable others skilled in the art to which it appertains to make and use the same.

My invention relates to improvements in bed pans and the object of my invention is to provide such a pan that may be used in various positions and is not injurious to the patient.

With this object in view, my invention consists in the construction and combinations of parts as hereinafter described and claimed.

In the accompanying drawings—Figure 1 is a perspective view of my invention. Fig. 2 is a longitudinal section of the same, and Fig. 3 is a top view of the same.

The pan is made, as shown, with a large part $a$, approximately circular in shape, and an extension $b$, about one third as long as the diameter of the circular part. The whole is formed in a single piece of, for instance, enameled iron, having its upper edge bent over a strengthening wire $c$.

$d$ is a handle.

$e$ is the removable shield nearly semicircular in shape, and its lower edge is adapted to fit within the part $a$. It is provided with a handle $f$. It is also provided with right-angled clips $g$, arranged to fit over the outside of the part $a$.

The advantage of my invention will be readily apparent to those familiar with nursing. The adjustable shield prevents splashing and the entire interior of the pan is smooth and unobstructed, which allows ready cleansing and disinfecting. Its shape and construction are such that it may be used for hours at a time without discomfort to the patient.

I claim:—

1. A bed pan constructed of an integral piece of material having a circular main portion provided with a long extension, said pan being entirely open at the top, and a shield therefor adapted to be adjusted circumferentially with relation to the circular main portion of the pan.

2. A bed pan constructed of an integral piece of material having a circular main portion provided with a long extension, said pan being entirely open at the top, and a shield therefor formed of a top portion with a depending semicircular side portion having substantially the same radius as said circular main portion, so that said shield may be adjusted circumferentially with relation to the circular main portion, and means for adjustably securing said shield to the circular main portion.

In testimony whereof, I affix my signature, in presence of two witnesses.

ANDREW HENHAPL.

Witnesses:
W. P. CRAWFORD,
ROSE CLEMENTS.